(12) United States Patent
Yuasa et al.

(10) Patent No.: US 6,803,699 B2
(45) Date of Patent: Oct. 12, 2004

(54) DRIVE MECHANISM EMPLOYING ELECTROMECHANICAL TRANSDUCER AND DRIVE METHOD THEREFOR

(75) Inventors: Tomoyuki Yuasa, Sakai (JP); Ryuichi Yoshida, Sakai (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 10/298,931

(22) Filed: Nov. 19, 2002

(65) Prior Publication Data
US 2004/0036382 A1 Feb. 26, 2004

(30) Foreign Application Priority Data
Aug. 21, 2002 (JP) ........................................ 2002-240864

(51) Int. Cl.[7] .............................................. H02N 2/00
(52) U.S. Cl. ............. 310/317; 310/316.01; 310/316.02; 310/323.02
(58) Field of Search ........................... 310/317, 316.01, 310/316.02, 323.02

(56) References Cited

U.S. PATENT DOCUMENTS

| 5,786,654 A | * | 7/1998 | Yoshida et al. | 310/328 |
| 5,969,464 A | * | 10/1999 | Nakano et al. | 310/328 |
| 6,051,909 A | * | 4/2000 | Shinke et al. | 310/316.01 |
| 6,140,750 A | * | 10/2000 | Ueyama | 310/369 |
| 6,232,697 B1 | * | 5/2001 | Mizumoto | 310/317 |
| 6,512,321 B2 | * | 1/2003 | Yoshida et al. | 310/316.01 |

FOREIGN PATENT DOCUMENTS

| JP | 2001-211669 | 8/2001 |
| JP | 2001-268951 | 9/2001 |

* cited by examiner

Primary Examiner—Tran Nguyen
Assistant Examiner—J. Aguirrechea
(74) Attorney, Agent, or Firm—McDermott Will & Emery LLP

(57) ABSTRACT

An actuator using a piezoelectric element and an operating method thereof. The actuator includes: the piezoelectric element; a drive rod fixed to the piezoelectric element; a moving unit engaging with the drive rod by a frictional force; and a driver for applying a voltage to the piezoelectric element. The voltage repeats a cycle of a first value which is one of a maximum value and a minimum value, a second value which is intermediate between the maximum value and the minimum value, and a third value which is the other of the maximum value and the minimum value so as to drive the driving unit with respect to the drive rod.

12 Claims, 12 Drawing Sheets

WAVEFORM OF FORWARD DIRECTION

WAVEFORM OF BACKWARD DIRECTION

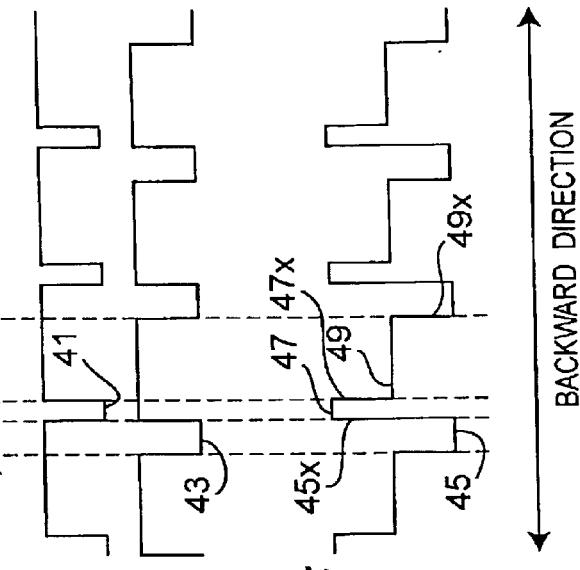
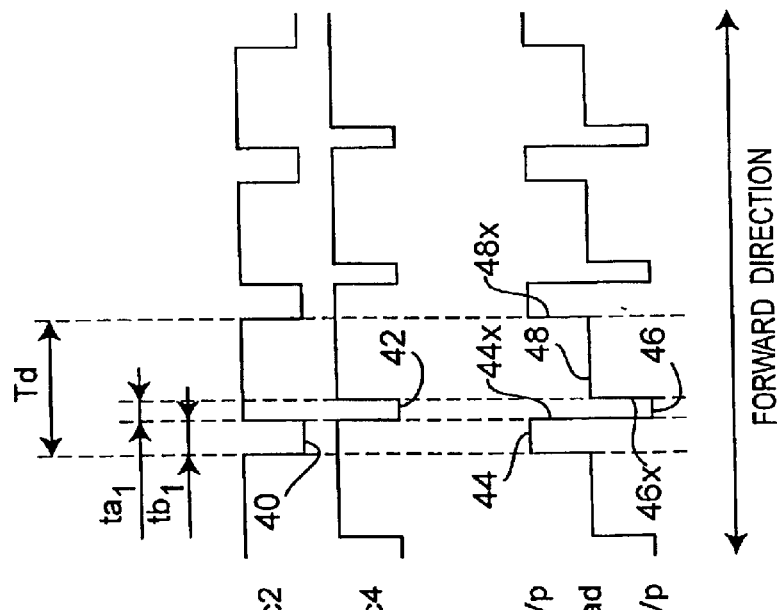

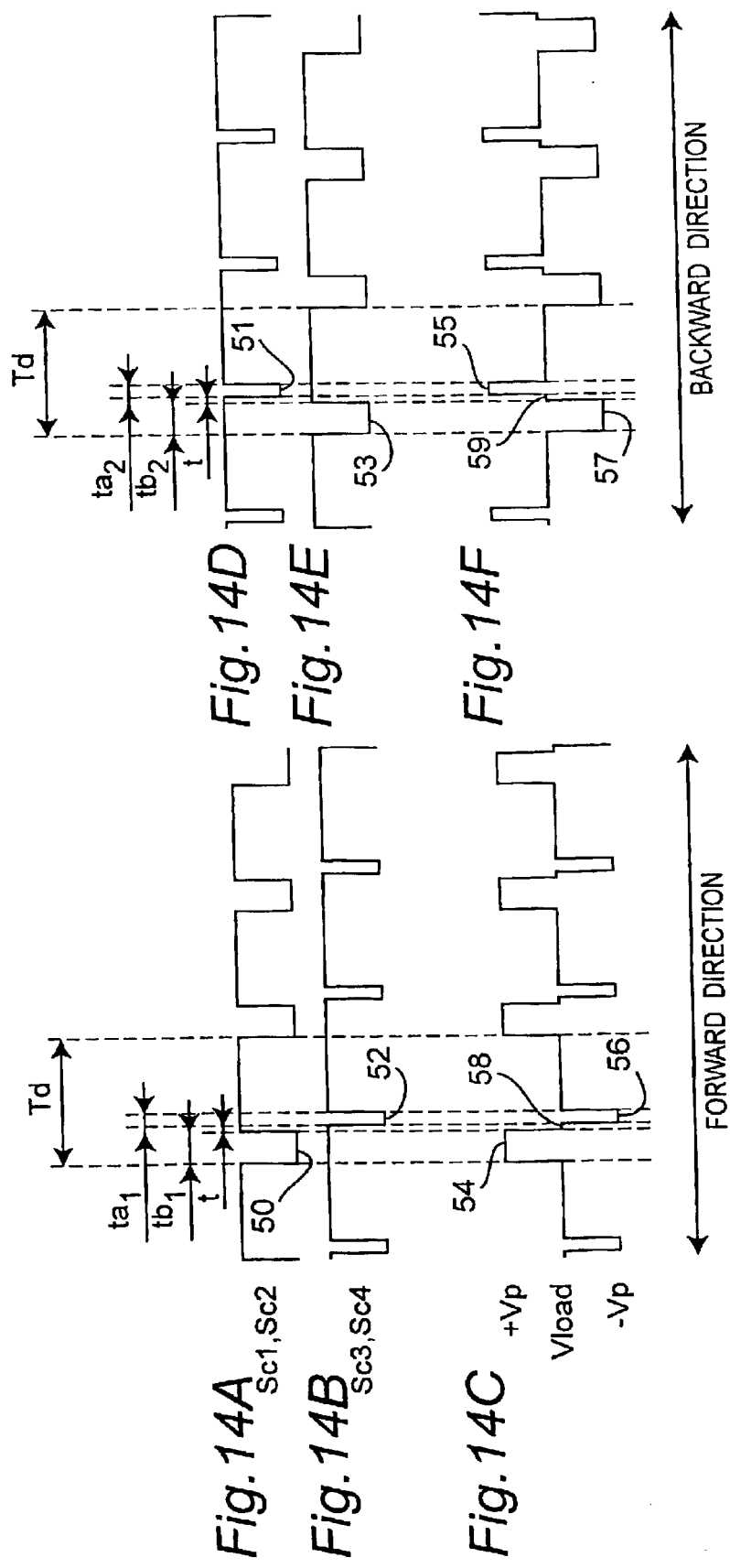

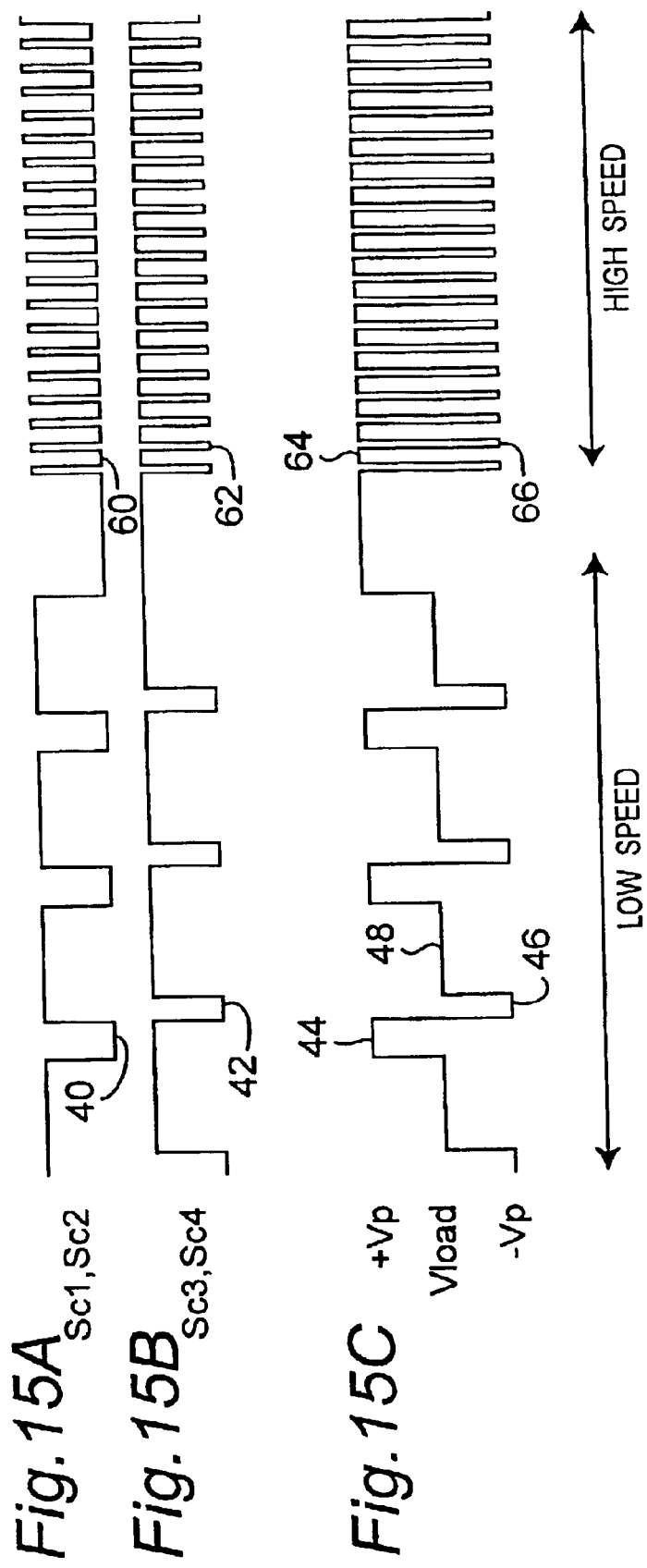

DRIVE MECHANISM EMPLOYING ELECTROMECHANICAL TRANSDUCER AND DRIVE METHOD THEREFOR

This application is based upon application No. 2002-240864 filed in Japan, the contents of which are hereby incorporated by reference.

BACKGROUND OF THE INVENTION

1. Field of the Invention

The present invention relates to a drive mechanism employing an electromechanical transducer and a drive method therefor. More specifically, the present invention relates to the drive mechanism employing the electromechanical transducer such as a piezoelectric element and the like, suitable for driving a lens of a camera, a precision stage and the like, and the method for controlling the drive mechanism.

2. Description of the Related Arts

Conventionally, there has been proposed a drive mechanism employing an electromechanical transducer.

For example, FIGS. 1A through 1C show such a drive mechanism of an element-fixed type schematically. One end of a piezoelectric element in an extending and contracting direction is connected to a fixed member (or a stationary member). The other end of the piezoelectric element in the same direction is connected to a drive member. The drive member moves in forward direction and backward direction, when the piezoelectric element extends or contracts. A moving body (or a driven member) is engaged with the drive member by a frictional force.

The moving body is driven when a voltage is applied to the piezoelectric element so as to cause the piezoelectric element to extend at a first velocity, and to contract at a second velocity, different from the first velocity. FIGS. 1A, 1B and 1C show respective states at points of time indicated by the reference characters A, B and C in FIG. 1D.

When the voltage gradually increases during a section A-B as shown in FIG. 1D, the piezoelectric element relatively slowly extends so that the state as shown in FIG. 1A changes into the state as shown in FIG. 1B. At the time, the moving body slides little, or it does not slide with respect to the drive member, and therefore the moving body moves together with the drive member substantially.

Secondly, when the voltage abruptly decreases during a section B-C as shown in FIG. 1D, the piezoelectric element contracts relatively fast so that the drive member returns to an initial position. At the time, the moving body stays at the present position substantially, and the moving body slides with respect to the drive member. Therefore, only the drive member returns to the initial position. As the result, the moving body moves from the initial position as shown in FIG. 1A to a forward position as shown in FIG. 1C.

Repeating such a cycle, the moving body moves along the drive member in a forward direction.

In the mean time, the moving body moves in a backward direction, when a voltage applied to the piezoelectric element has a waveform including rapidly increasing parts and gradually decreasing parts.

In order to run the drive mechanism, there are two manners of applying a voltage having a saw-tooth waveform to the piezoelectric element.

FIGS. 2 shows a first manner thereof. As shown in FIG. 2A, a waveform generator W, specifically a digital-analog transducer therein, for example, of 8 bits and 1–5 volts type, generates a voltage having a saw-tooth waveform. The voltage having the saw-tooth waveform is amplified, for example, up to 1–10 volts, by an amplifier M, and then is applied to a piezoelectric element X in order to run the drive mechanism. By adjusting the waveform generator W, a waveform of forward direction as shown in FIG. 2B and a waveform of backward direction as shown in FIG. 2C can be generated.

FIGS. 3 and 4 show a second manner thereof. FIG. 3 shows a circuit for applying a power-supply voltage V to a piezoelectric element X. The circuit includes constant current circuits A, D and switching circuits B, C. The waveform of forward direction or the waveform of backward direction are generated by actuating the constant current circuit A and the switching circuit B alternately, or by actuating the constant current circuit D and the switching circuit C alternately.

For example, the circuit is constituted as shown in FIG. 4A. When control signals are input to terminals "a", "b", "c" and "d" of the circuit, the waveform of forward direction or the waveform of backward direction is generated, as shown in FIG. 4B.

Specifically, when the terminal "a" is supplied with Hi input, the voltage applied to a piezoelectric element X gradually increases through the constant current circuit A as shown by the reference numeral 10 in FIG. 3B. Next, when the terminal "b" is supplied with Hi input, the piezoelectric element X is grounded through the switch circuit B, so that the voltage applied to the piezoelectric element X rapidly decreases as shown by the reference numeral 12 in FIG. 4B. Thus, the waveform of forward direction is generated.

In the mean time, when the terminal "c" is supplied with Hi input, the piezoelectric element X is connected to the power-supply voltage V through the switch circuit C, so that the voltage applied to the piezoelectric element X rapidly increases as shown by the reference numeral 14 in FIG. 4B. Then, when the terminal "d" is supplied with Hi input, the voltage applied to the piezoelectric element X gradually decreases through the constant current circuit D as shown by the reference numeral 16 in FIG. 4B. Thus, the waveform of backward direction is generated.

In the first manner, the waveform generator W and the power amplifier M are needed. In the second manner, the constant current circuits A, D and the switch circuits B, C are needed. Thus, the construction of the circuit is complex and leads to high cost. Moreover, it is difficult to achieve stable low-speed running of the drive mechanism.

SUMMARY OF THE INVENTION

Accordingly, it is an object of the present invention to provide a drive mechanism which comprises a drive circuit employing a simple construction and achieving stable low-speed driving.

It is another object of the present invention to provide a drive method for carrying out the stable low-speed driving.

In order to achieve one of the above objects, according to one aspect of the present invention, there is provided a drive mechanism, comprising: an electromechanical transducer having a pair of ends in expanding and contracting direction; a drive member fixed to one of the ends of the electromechanical transducer; a driven member which contacts frictionally with the drive member under a predetermined frictional force exerted therebetween; and a drive circuit for applying a drive voltage to the electromechanical transducer, wherein the drive voltage repeats a cycle of a first voltage having a value which is one of a maximum value and a minimum value, a second voltage having a value which is a value intermediate between the maximum value and the minimum value, and a third voltage having a value which is the other of the maximum value and the minimum value, and wherein applying the drive voltage to the electromechanical transducer causes the electromechanical transducer to expand and to contract so as to move the driven member along the drive member relatively.

Generally, the electromechanical transducer (for example, piezoelectric transducer, electrostriction transducer, magnetostriction transducer, electrostatic actuator and the like) changes the electrical energy (for example, electric voltage, electric current, electric field, magnetic field, static electricity and the like) supplied thereto into the mechanical energy (for example, transformation or strain such as prolonging, compressing, expanding, contracting, bending, twisting and the like).

In the configuration, while the drive voltage changes from the first voltage to the third voltage through the second voltage, the change of the drive voltage is relatively gradual. Therefore, the electromechanical transducer expands or contracts gradually so that the driven member moves together with the drive member without sliding with respect to the drive member substantially. In the meantime, while the drive voltage changes from the third voltage to the first voltage with maximum amplitude thereof, the change of the drive voltage is relatively rapid. Therefore, the electromechanical transducer expands or contracts rapidly so that the driven member slides with respect to the drive member. By repeating such a cycle, it is possible to move or drive the driven member with respect to the drive member in a predetermined direction.

According to the configuration, even if a period for which the second voltage is applied to the electromechanical element varies, variation of sliding amount per cycle caused by changing the drive voltage from the third voltage to the first voltage is little or nothing, and only the frequency of sliding, or interval period of the cycle, changes. Thereby, it is possible to run the drive mechanism at a low speed stably, by extending the period for which the second voltage is applied to the electromechanical transducer. Moreover, it is possible to realize the drive circuit for switching the drive voltage as described above, employing a simple construction.

It is not necessary to keep the second voltage constant, because small variation of the second voltage with cycles is not critical in connection with the performance of the drive mechanism. The time for which the drive voltage applied to the electromechanical transducer changes from the third voltage to the first voltage should be short enough to cause the relative sliding between the drive member and the driven member. Therefore, if such a criteria is satisfied, the drive voltage may keep, for example, 0 (zero) volt in the middle of changing from the third voltage to the first voltage.

As an embodiment, inequalities of $$(n_1+1)T-0.3T \leq ta \leq (n_1+1)T+0.3T \quad (1)$$

$$0.95(n_2+0.5)T-0.3T \leq tb \leq 0.95(n_2+0.5)T+0.3T \quad (2)$$

$$ta+tb<Td \quad (3)$$

are satisfied, where T is a resonance period of a system including the electromechanical transducer and the drive member, where Td is a drive period of the drive voltage applied to the electromechanical transducer by the drive circuit, where ta is a first period for which the first voltage is applied to the electromechanical element, where tb is a third period for which the third voltage is applied to the electromechanical transducer, where $n_1$ is one of zero and positive integers, and where $n_2$ is one of zero and positive integers.

When the first period for which the first voltage is applied to the electromechanical element and the third period for which the third voltage is applied to the electromechanical transducer have some relationship with the resonance period of the system including the electromechanical transducer and the drive member as described in the above embodiment, it is possible to run the drive mechanism efficiently.

As an embodiment, the first voltage and the third voltage are equal and of opposite sign, and wherein the second voltage is zero volt.

In the embodiment, it is possible to reduce variation or kinds of parts of the drive circuit in order to employ a simple construction.

As an embodiment, applying the drive voltage to the electromechanical transducer causes the electromechanical transducer to expand at a first velocity and to contract at a second velocity, different from the first velocity, so as to move the driven member along the drive member relatively.

As an embodiment, the drive voltage applied to the electromechanical transducer has a generally square waveform comprising horizontal straight parts and vertical straight parts.

As an embodiment, the drive circuit comprises: a first switching unit for applying the first voltage to the electromechanical transducer; a second switching unit for applying the second voltage to the electromechanical transducer; a third switching unit for applying the third voltage to the electromechanical transducer; and a controller for controlling the first switching unit, the second switching unit, the third switching unit and the fourth switching unit so that the drive voltage repeats the cycle.

In the embodiment, it is possible to employ common parts for the switching units.

As an embodiment, the electromechanical transducer having a pair of terminals, and wherein the drive circuit comprises: a first switching element operating as a switch and having a pair of terminals; a second switching element operating as a switch and having a pair of terminals; a third switching element operating as a switch and having a pair of terminals; a fourth switching element operating as a switch and having a pair of terminals; and a controller for controlling the first switching element, the second switching element, the third switching element and the fourth switching element, wherein one of the terminals of the electromechanical transducer is connected to one of the terminals of the first switching element and one of the terminals of the second element, wherein the other of the terminals of the electromechanical transducer is connected to one of the terminals of the third switching element and one of the terminals of the fourth element, wherein the other of the terminals of the first switching element and the other of the terminals of the third switching element are connected to one of terminals of a power source, and wherein the other of the terminals of the second switching element and the other of the terminals of the fourth switching element are connected to the other of the terminals of the power source.

In order to achieve another of the above objects, according to another aspect of the present invention, there is provided a drive method for running a drive mechanism which comprises: an electromechanical transducer having a pair of ends in expanding and contracting direction; a drive member fixed to one of the ends of the electromechanical transducer; and a driven member which contacts frictionally with the drive member under a predetermined frictional force exerted therebetween, the drive method comprising: a first step of generating a drive voltage, wherein the drive voltage repeats a cycle of a first voltage having a value which is one of a maximum value and a minimum value, a second voltage having a value which is a value intermediate between the maximum value and the minimum value, and a third voltage having a value which is the other of the maximum value and the minimum value; a second step of applying the drive voltage generated at the first step to the electromechanical transducer; and a third step of expanding and contracting the electromechanical transducer by the drive voltage applied to the electromechanical transducer at the second step so as to move the driven member along the drive member relatively.

Generally, the electromechanical transducer (for example, piezoelectric transducer, electrostriction transducer, magnetostriction transducer, electrostatic actuator and the like) changes the electrical energy (for example, electric voltage, electric current, electric field, magnetic field, static electricity and the like) supplied thereto into the mechanical energy (for example, transformation or strain such as prolonging, compressing, expanding, contracting, bending, twisting and the like).

In the configuration, while the drive voltage changes from the first voltage to the third voltage through the second voltage, the change of the drive voltage is relatively gradual. Therefore, the electromechanical transducer expands or contracts gradually so that the driven member moves together with the drive member without sliding with respect to the drive member substantially. In the meantime, while the drive voltage changes from the third voltage to the first voltage with maximum amplitude thereof, the change of the drive voltage is relatively rapid. Therefore, the electromechanical transducer expands or contracts rapidly so that the driven member slides with respect to the drive member. By repeating such a cycle, it is possible to move or drive the driven member with respect to the drive member in a predetermined direction.

According to the drive method, even if a period for which the second voltage is applied to the electromechanical element varies, variation of sliding amount per cycle caused by changing the drive voltage from the third voltage to the first voltage is little or nothing, and only the frequency of sliding, or interval period of the cycle, changes. Thereby, it is possible to run the drive mechanism at a low speed stably, by extending the period for which the second voltage is applied to the electromechanical transducer. Moreover, it is possible to realize the drive circuit for switching the drive voltage as descried above, employing a simple construction.

As an embodiment, inequalities of $$(n_1+1)T-0.3T \leq ta \leq (n_1+1)T+0.3T \quad (1')$$

$$0.95(n_2+0.5)T-0.3T \leq tb \leq 0.95(n_2+0.5)T+0.3T \quad (2')$$

$$ta+tb<Td \quad (3')$$

are satisfied, where T is a resonance period of a system including the electromechanical transducer and the drive member, where Td is a drive period of the drive voltage applied to the electromechanical transducer by the drive circuit, where ta is a first period for which the first voltage is applied to the electromechanical element, where tb is a third period for which the third voltage is applied to the electromechanical transducer, where $n_1$ is one of zero and positive integers, and where $n_2$ is one of zero and positive integers.

When the first period for which the first voltage is applied to the electromechanical element and the third period for which the third voltage is applied to the electromechanical transducer have some relationship with the resonance period of the system including the electromechanical transducer and the drive member as described in the above embodiment, it is possible to run the drive mechanism efficiently.

As an embodiment, the first voltage and the third voltage are equal and of opposite sign, and wherein the second voltage is zero volt.

In the embodiment, it is possible to reduce variation or kinds of parts of the drive circuit in order to employ a simple construction.

As an embodiment, applying the drive voltage to the electromechanical transducer at the third step causes the electromechanical transducer to expand at a first velocity and to contract at a second velocity, different from the first velocity, so as to move the driven member along the drive member relatively.

As an embodiment, the drive voltage generated at the first step has a generally square waveform comprising horizontal straight parts and vertical straight parts.

BRIEF DESCRIPTION OF THE DRAWINGS

These and other objects and features of the present invention will become clear from the following description taken in conjunction with the preferred embodiments thereof with reference to the accompanying drawings.

FIGS. 7A through 7C are a set of timing charts as to the detail circuit diagram as shown in FIG. 6.

FIGS. 7D through 7F are another set thereof.

FIGS. 14A through 14C are a set of timing charts as to the detail circuit diagram as shown in FIG. 6, according to a second embodiment of the present invention.

FIGS. 14D through 14F are another set thereof.

FIGS. 15A through 15C are a set of timing charts as to the detail circuit diagram as shown in FIG. 6, according to a third embodiment of the present invention.

DETAILED DESCRIPTION OF THE PREFERRED EMBODIMENTS

Figure 1A:
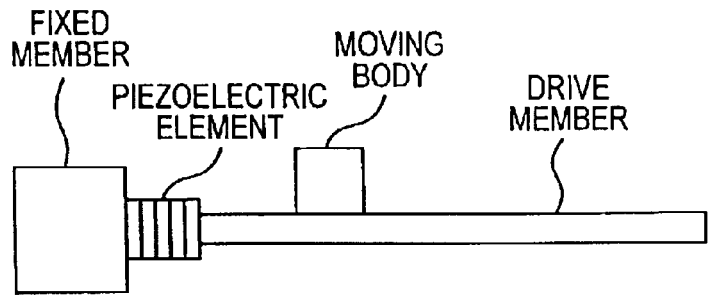
FIGS. 1A through 1C are schematic illustrations of a conventional driving mechanism.
Figure 1B:
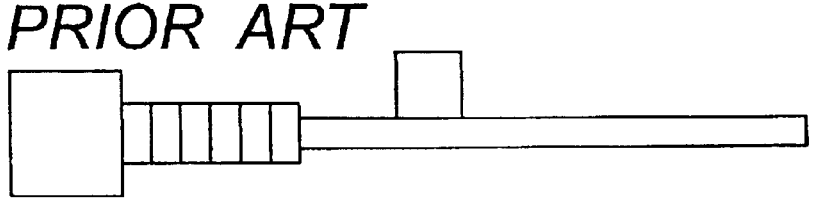
Figure 1C:
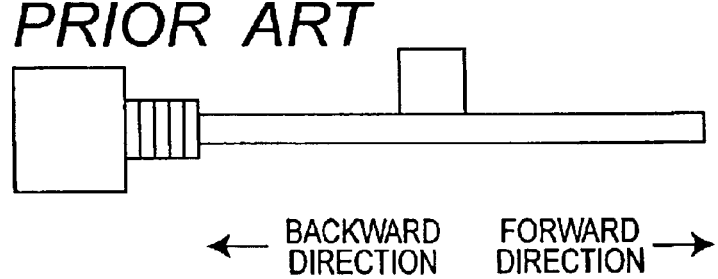
Figure 1D:
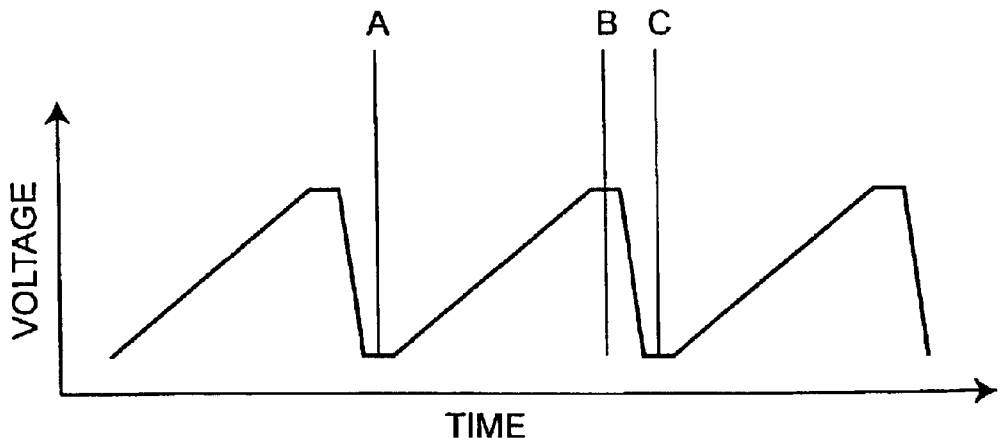
FIG. 1D is a waveform chart of a voltage applied to a piezoelectric element in the driving mechanism as shown in FIGS. 1A through 1C.
Figure 2A:
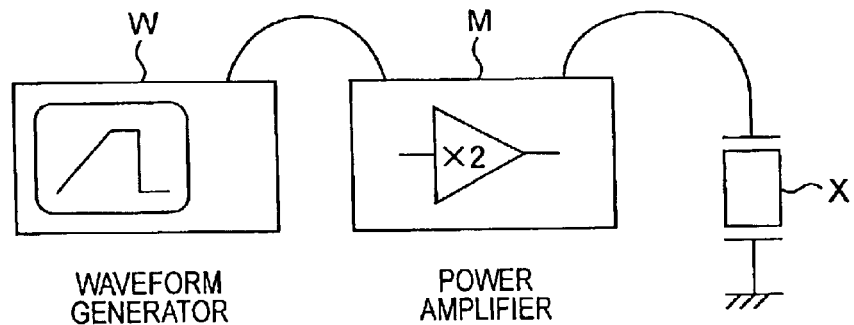
FIG. 2A is a schematic illustration showing a first conventional manner of running a drive mechanism.
Figure 2B:
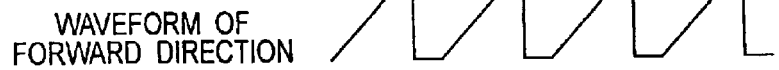
FIGS. 2B and 2C are waveform charts showing waveforms generated by the first conventional manner as shown in FIG. 2A.
Figure 2C:
Figure 3:
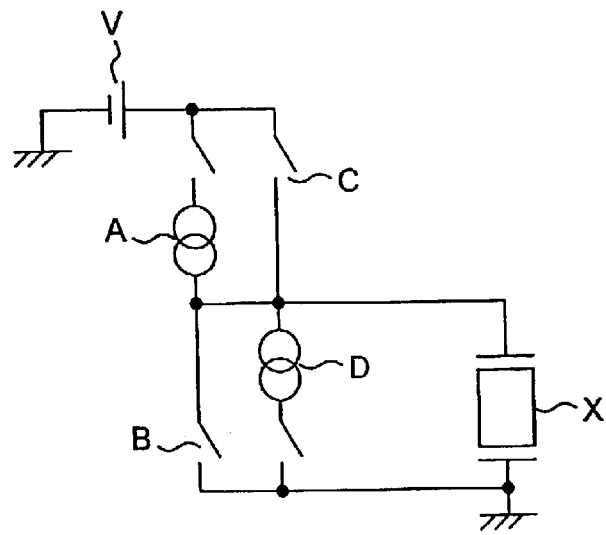
FIG. 3 is a circuit diagram showing a second conventional manner of running the drive mechanism.
Figure 4A:
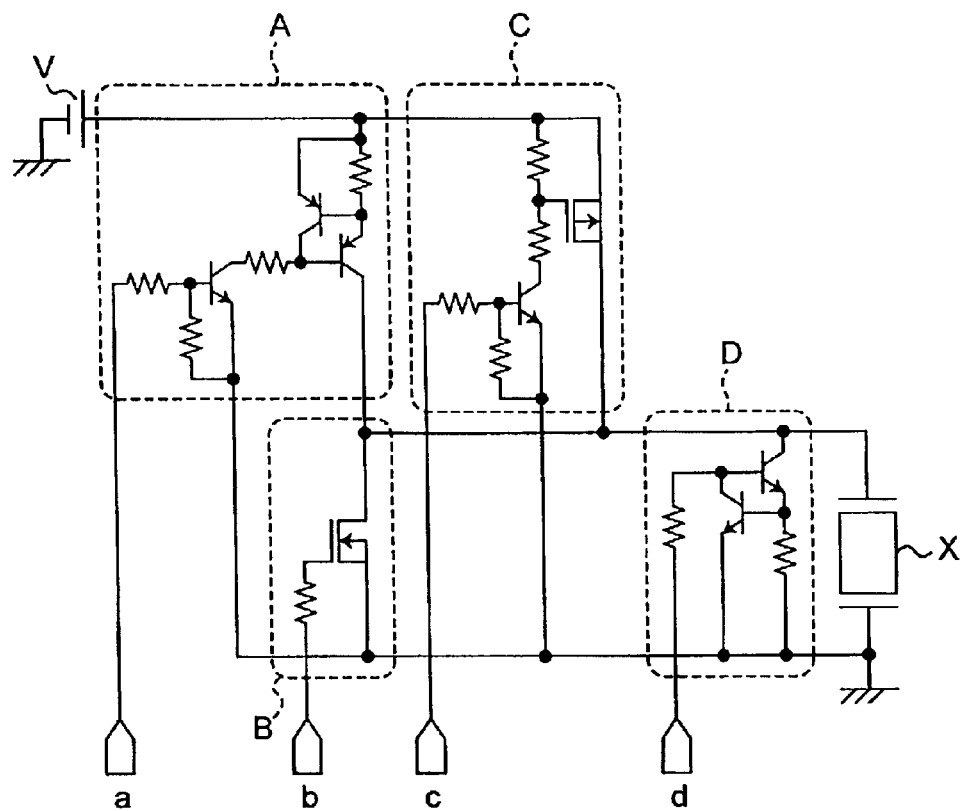
FIG. 4A is a detail circuit diagram of FIG. 3.
Figure 4B:
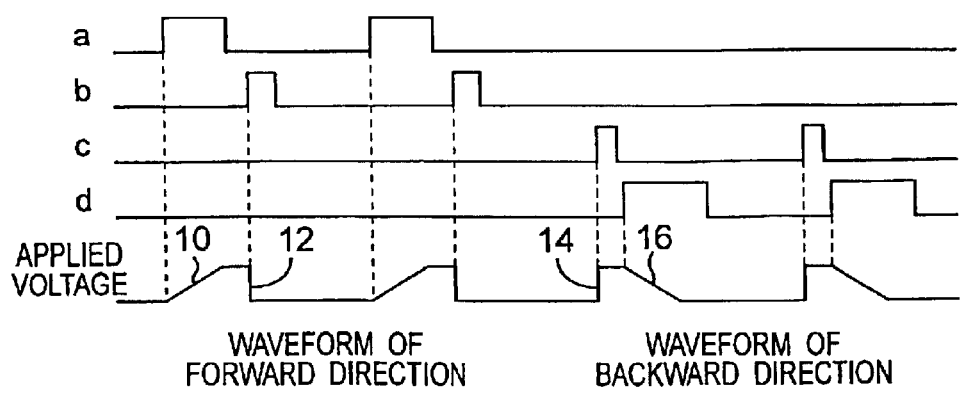
FIG. 4B is a set of timing charts as to the circuit diagram of FIG. 4A.

Before the description of the preferred embodiments according to the present invention proceeds, it is to be noted that like or corresponding parts are designated by like reference numerals or characters throughout the accompanying drawings.

A detailed description is made below upon a drive mechanism of the preferred embodiments, with reference to FIG. 5A through FIG. 15C.

First, referring to FIGS. 5A through 13, the description is made below in detail on a drive mechanism, according to a first embodiment of the present invention.

Figure 5A:
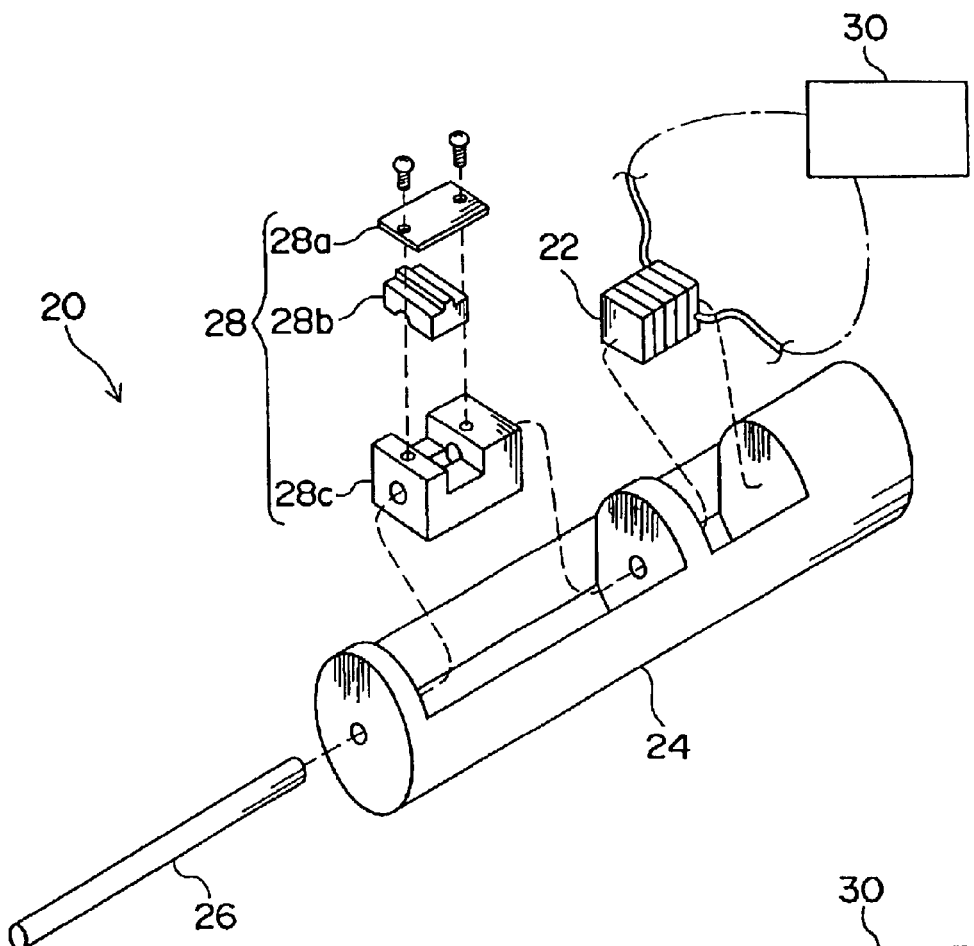
FIG. 5A is a schematic exploded view of the drive mechanism according to a first embodiment of the present invention.
Figure 5B:
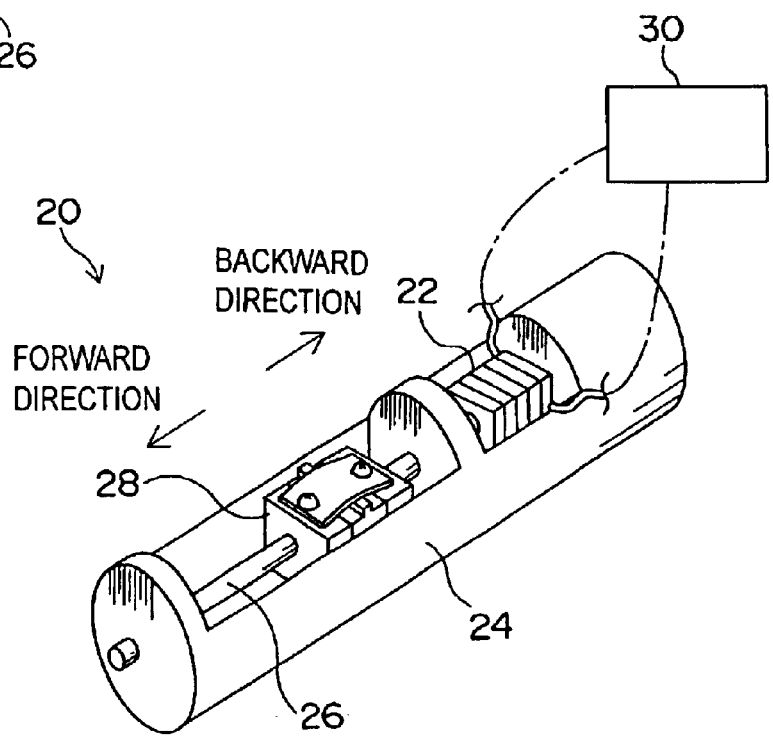
FIG. 5B is a perspective view of the drive mechanism as shown in FIG. 5A.

FIGS. 5A and 5B show a specific construction of the drive mechanism 20 according to the first embodiment. FIG. 5A is an exploded view of the drive mechanism 20, and FIG. 5B is a perspective view of its assembled drive mechanism 20.

The drive mechanism 20 comprises a fixed member 24, a piezoelectric element 22, a drive rod 26 and a driven unit 28. The fixed member 24 is fixed to a stationary member of an unshown apparatus (for example, a base of an XY-table). The piezoelectric element 22 is, for example, of a laminated type. The drive rod 26 is slidably supported by the fixed member 24. The driven unit 28 is connected to a driven part (not shown) such as a stage in the XY-table. One end of the piezoelectric element 22 in an extending and contracting direction is fixed to an end of the fixed member 24, and the other end of the piezoelectric element 22 in the extending and contracting direction is fixed to an end of the drive rod 26. The driven unit 28, including a slider 28c, a contact member 28b, and a spring plate 28a, is engaged with the drive rod 26 by a frictional force so as to be able to slide along the drive rod 26. When a drive circuit 30 applies a voltage having a suitable waveform to the piezoelectric element 22 of the drive mechanism 20 so as to cause the drive rod 26 to vibrate axially, the driven unit 28 moves along the drive rod 26 in a desired direction (that is, in a forward direction or in a backward direction).

That is, the piezoelectric element 22 performs as an electromechanical transducer, a drive rod 26 performs as a drive member, and the driven unit 28 performs as a moving body or a driven member.

Figure 6:
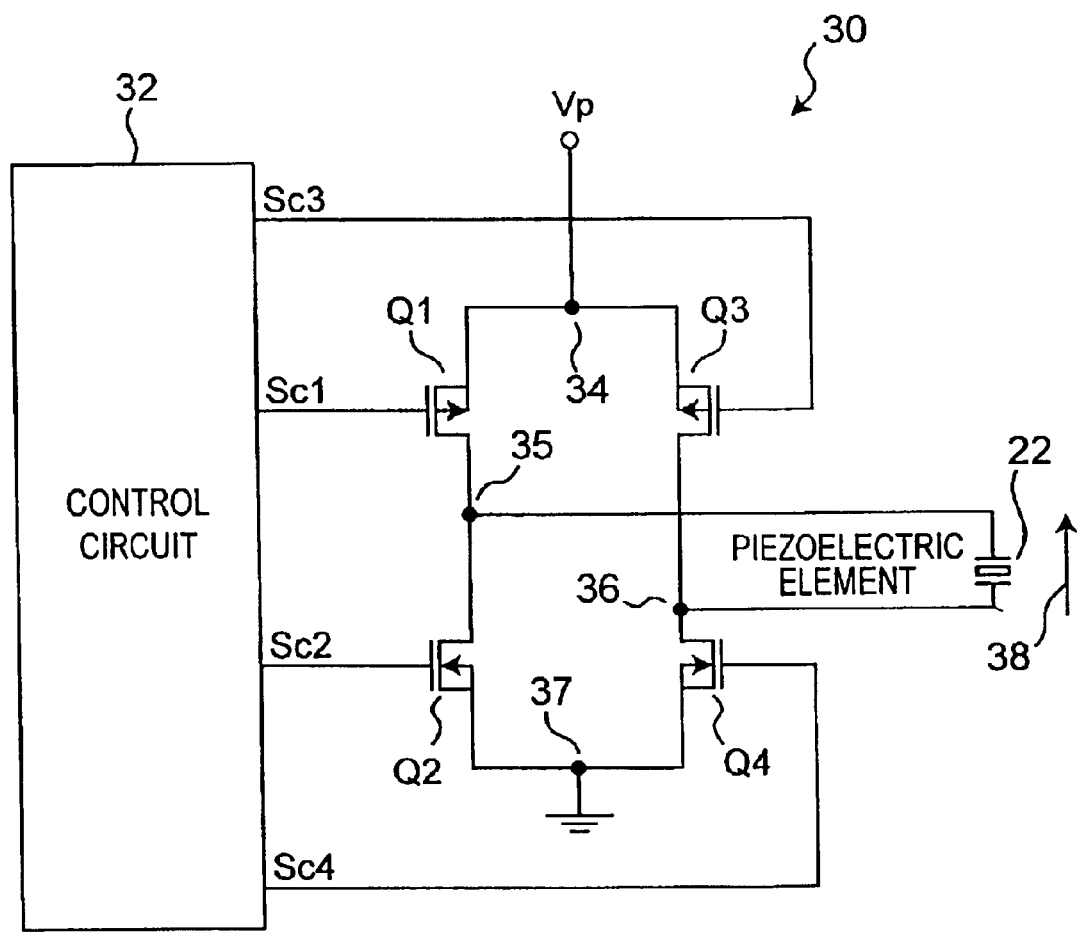
FIG. 6 is a detailed circuit diagram of the drive mechanism as shown in FIGS. 5A and 5B.

FIG. 6 shows a detailed circuit diagram of the drive mechanism 20.

The drive circuit 30 comprises a control circuit 32 and four switching elements Q1, Q2, Q3 and Q4, which are arranged to apply a voltage between terminals of the piezoelectric element 22.

Each of switching elements Q1, Q2, Q3 and Q4 is MOSFET (metal oxide semiconductor field effect transistor). Gates of switching elements Q1, Q2, Q3 and Q4 are connected to terminals Sc1, Sc2, Sc3 and Sc4 of the control circuit 32 respectively, so as to be input high signal or low signal. Switching elements Q1 and Q3 are of the p channel type. Therefore, low signal at a gate causes an on (or conductive) state between a source and a drain, and high signal at the gate causes an off (or non-conductive) state between the source and the drain. Switching elements Q2 and Q4 are of the n channel type. Therefore, high signal at a gate causes an on (or conductive) state between a source and a drain, and low signal at the gate causes an off (or non-conductive) state between the source and the drain.

Specifically, the source of the switching element Q1 and the source of the switching element Q3 are connected by a connecting point 34 to a power source Vp. The drain of the switching element Q1 is connected to the drain of the switching element Q2 through a connecting point 35. The drain of the switching element Q3 is connected to the drain of the switching element Q4 through a connecting point 36. The source of the switching element Q2 and the source of the switching element Q4 are connected by a connecting point 37 to ground. Terminals of the piezoelectric element 22 are connected to the connecting points 35 and 36, respectively.

FIGS. 7A through 7F are two sets of timing charts, which show operation of the control circuit 32. FIGS. 7A and 7D show respective voltages at terminals Sc1, Sc2 of the control circuit 32, that is, respective voltages of gates of switching elements Q1, Q2. FIGS. 7B and 7E show respective voltages at terminals Sc3, Sc4 of the control circuit 32, that is, respective voltages of gates of switching elements Q3, Q4. FIGS. 7C and 7F show a drive voltage Vload applied between terminals of the piezoelectric element 22. A positive direction of the drive voltage Vload is indicated by a direction of an arrow 38 in FIG. 6.

As shown in FIGS. 7A through 7F, the drive circuit 30 repeats a cycle, a period Td of which consists of a first section, a second section and a third section, so as to drive the driven unit 28 in the forward direction or in the backward direction.

FIGS. 7A through 7C shows a case of driving the driven unit 28 in the forward direction.

During the first section, the length of which is $tb_1$, terminals Sc1, Sc2 are in a state of low signal as shown by a reference numeral 40 in FIG. 7A, and terminals Sc3, Sc4 remain in a state of high signal as shown in FIG. 7B, so that switching elements Q1, Q4 are on or in a conductive state and switching elements Q2, Q3 are off or in a non-conductive state in the circuit as shown in FIG. 6. Thereby, the connecting point 36 is connected by the switching element Q4 to the ground, and the connecting point 35 is connected by the switching element Q1 to the power source Vp. Thus, the drive voltage Vload between terminals of the piezoelectric element 22 becomes +Vp as shown by a reference numeral 44 in FIG. 7C.

During the second section, the length of which is $ta_1$, terminals Sc1, Sc2 are in a state of high signal as shown in FIG. 7A, and terminals Sc3, Sc4 are in a state of low signal as shown by a reference numeral 42 in FIG. 7B, so that switching elements Q1, Q4 are off or in a non-conductive state and switching elements Q2, Q3 are on or in a conductive state. Thereby, the connecting point 35 is connected by the switching element Q2 to the ground, and the connecting point 36 is connected by the switching element Q3 to the power source Vp. Thus, the drive voltage Vload between terminals of the piezoelectric element 22 becomes −Vp as shown by a reference numeral 46 in FIG. 7C abruptly.

During the third section, the length of which is $(Td-ta_1-tb_1)$, terminals Sc1, Sc2 remain in the state of high signal as shown in FIG. 7A, and terminals Sc3, Sc4 are in the state of high signal as shown in FIG. 7B, so that switching elements Q1, Q3 are off or in non-conductive state and switching elements Q2, Q4 are on or in a conductive state. Thereby, the connecting point 35 is connected by switching elements Q2, Q4 to the connecting point 36, and terminals of the piezoelectric element 22 short with each other. Thus, the drive voltage Vload between terminals of the piezoelectric element 22 becomes 0 (zero) volt as shown by a reference numeral 48 in FIG. 7C.

Two rising parts 46x, 48x, the respective ranges of which are relatively small, cause the driven unit 28 to move together with the drive rod 26 in the forward direction. A falling part 44x, a range of which is relatively large, causes the drive rod 26 to move rapidly in the backward direction, while the driven unit 28 remains at the present position substantially. It is possible to drive the driven unit 28 in the forward direction along the drive rod 26 by repeating such a cycle.

As for the drive voltage Vload, −Vp indicated by the reference numeral 46 corresponds to a first voltage, 0 (zero) volt indicated by the reference numeral 48 corresponds to a second voltage, and +Vp indicated by the reference numeral 44 corresponds to a third voltage.

FIGS. 7D through 7F show a case of driving the driven unit 28 in the backward direction.

During the first section, the length of which is $tb_2$, terminals Sc1, Sc2 are in a state of high signal as shown in FIG. 7D, and terminals Sc3, Sc4 are in a state of low signal as shown by a reference numeral 43 in FIG. 7E, so that switching elements Q1, Q4 are off or in a non-conductive state and switching elements Q2, Q3 are on or in a conductive state in the circuit as shown in FIG. 6. Thereby, the connecting point 35 is connected by the switching element Q2 to the ground, and the connecting point 36 is connected by the switching element Q3 to the power source Vp. Thus, the drive voltage Vload between terminals of the piezoelectric element 22 becomes −Vp as shown by a reference numeral 45 in FIG. 7F.

During the second section, the length of which is $ta_2$, terminals Sc1, Sc2 are in a state of low signal as shown by a reference numeral 41 in FIG. 7D, and terminals Sc3, Sc4 are in a state of high signal as shown in FIG. 7E, so that switching elements Q1, Q4 are on or in a conductive state and switching elements Q2, Q3 are off or in a non-conductive state. Thereby, the connecting point 36 is connected by the switching element Q4 to the ground, and the connecting point 35 is connected by the switching element Q1 to the power source Vp. Thus, the drive voltage Vload between terminals of the piezoelectric element 22 becomes +Vp as shown by a reference numeral 47 in FIG. 7F abruptly.

During the third section, the length of which is (Td−$ta_2$−$tb_2$), terminals Sc1, Sc2 are in the state of high signal as shown in FIG. 7D, and terminals Sc3, Sc4 remain in the state of high signal as shown in FIG. 7E, so that switching elements Q1, Q3 are off or in an non-conductive state and switching elements Q2, Q4 are on or in a conductive state. Thereby, the connecting point 35 is connected by the switching element Q2, Q4 to the connecting point 36, and terminals of the piezoelectric element 22 short with each other. Thus, the drive voltage Vload between terminals of the piezoelectric element 22 becomes 0 (zero) volt as shown by a reference numeral 49 in FIG. 7F.

Two falling parts 47x, 49x, respective ranges of which are relatively small, cause the driven unit 28 to move together with the drive rod 26 in the backward direction. A rising part 45x, a range of which is relatively large, causes the drive rod 26 to move rapidly in the forward direction, while the driven unit 28 remains at the present position substantially. It is possible to drive the driven unit 28 in the backward direction along the drive rod 26 by repeating such a cycle.

As for the drive voltage Vload, +Vp indicated by the reference numeral 47 corresponds to a first voltage, 0 (zero) volt indicated by the reference numeral 49 corresponds to a second voltage, and −Vp indicated by the reference numeral 45 corresponds to a third voltage.

Figure 8:
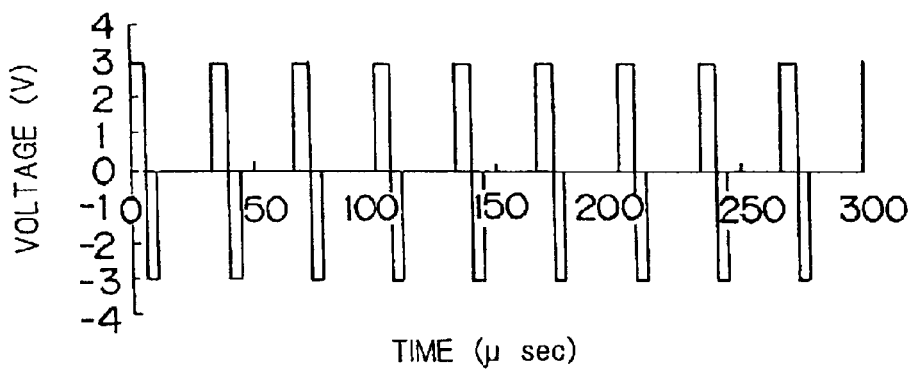
FIGS. 8 is a waveform chart of a voltage at a piezoelectric element.
Figure 9:
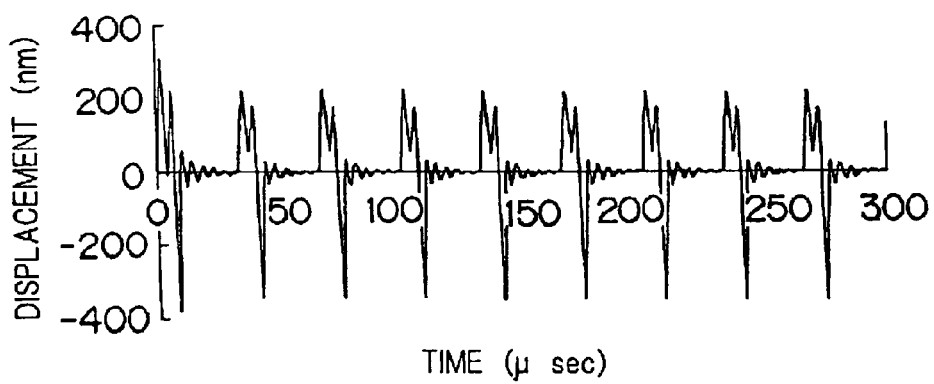
FIG. 9 shows a displacement of a drive rod.
Figure 10:
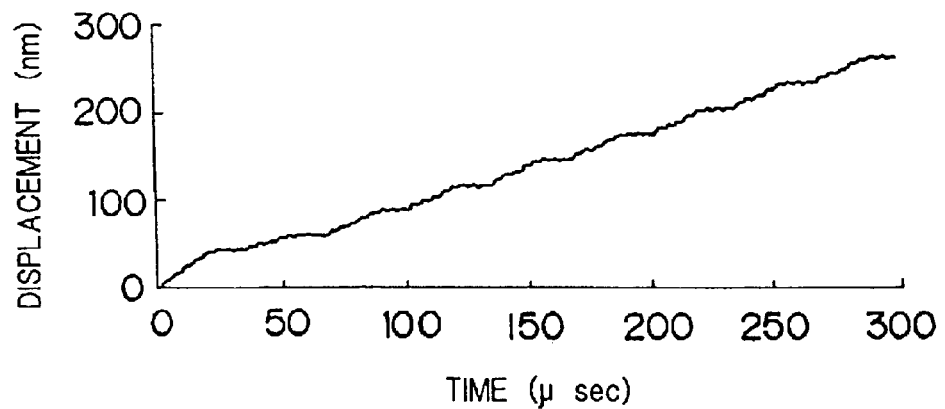
FIG. 10 shows a displacement of a moving unit.

FIGS. 8 through 10 show respective values of the drive voltage Vload (volt), axial displacement of the drive rod 26 (nm), and axial displacement of the driven unit 28 (nm), as a function of the time (micro-second), with regard to the driving mechanism 20 in which the resonance frequency 1/T of the system including the piezoelectric element 22 and the drive rod 26 is 230 kHz, when the driven unit 28 is driven in the forward indication in the following conditions: the voltage of the power source Vp is 3 volt, the drive frequency 1/Td is 30 kHz, $ta_1$ is 1.0T (4.35 micro-second), and $tb_1$ is 1.5T (6.52 micro-second).

In those conditions, each cycle of the waveform of the drive voltage Vload causes the driven unit 28 to move at the distance of about 30 nm, and then the average of the velocity of the driven unit 28 is about 1 mm/sec.

Figure 11:
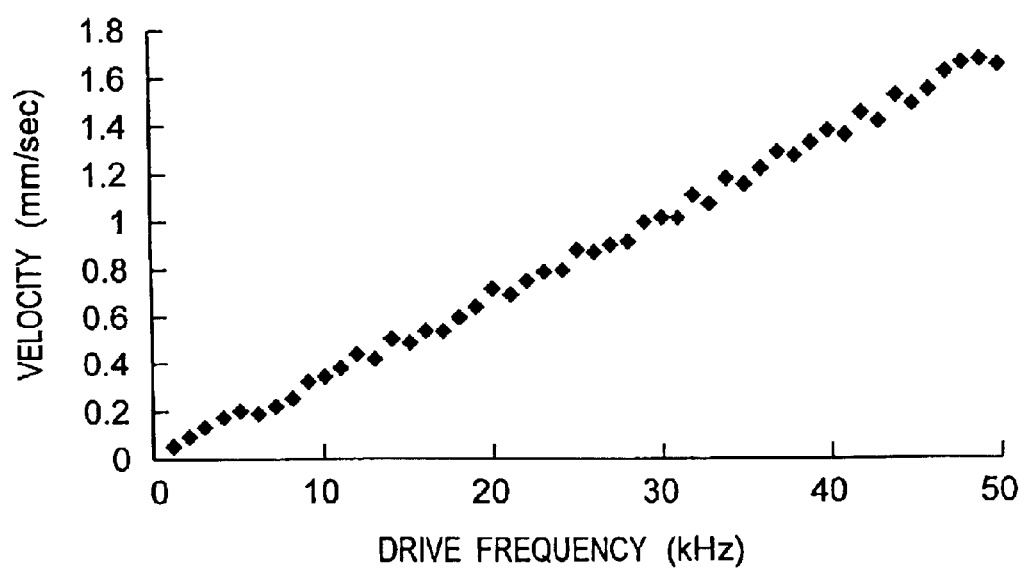
FIG. 11 is a graph showing a relationship between the velocity of the moving unit and a drive frequency.

FIG. 11 shows the velocity of the driven unit 28 as a function of the drive frequency 1/Td, in the following conditions: $ta_1$ is 1.0T (4.35 micro-second), and $tb_1$ is 1.5T (6.52 micro-second). The figure shows a substantially linear relationship of the average velocity of the driven unit 28 to the drive frequency 1/Td, because varying the drive frequency 1/Td causes no or little change of the displacement per cycle of the driven unit 28.

Figure 12:
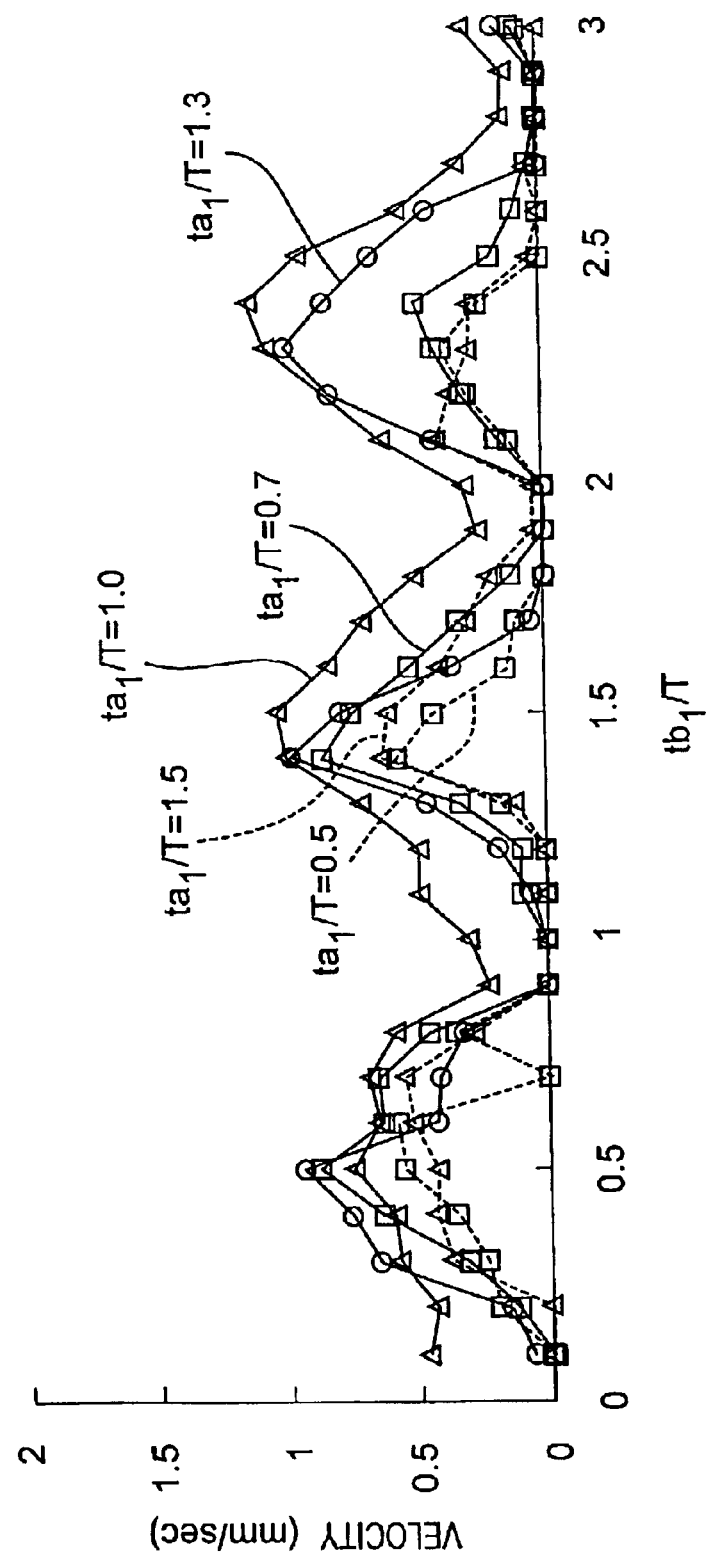
FIG. 12 is a graph showing a relationship between the velocity of the moving unit and a factor of $tb_1/T$.
Figure 13:
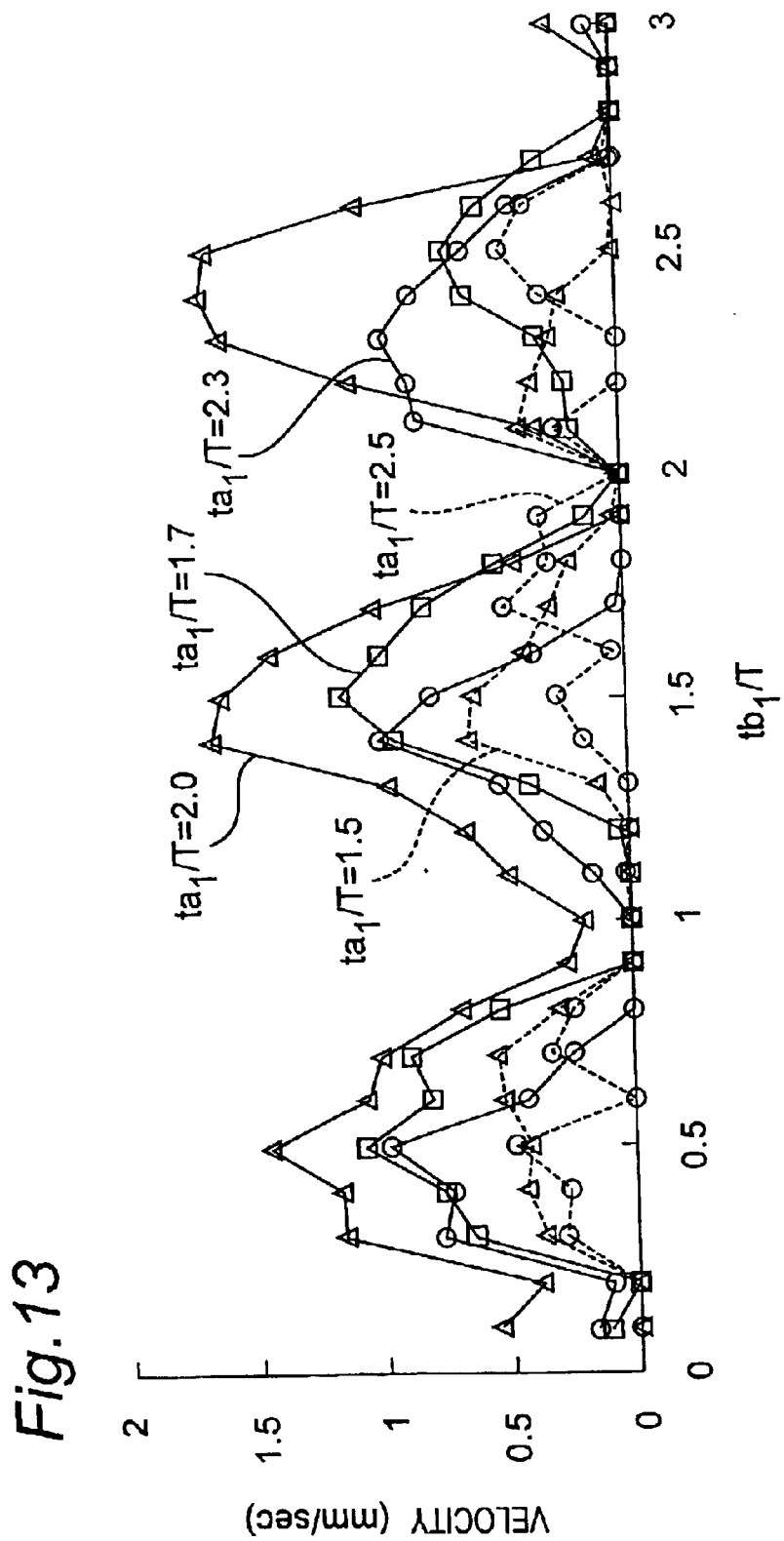
FIG. 13 is another graph similar to FIG. 12.

FIGS. 12 and 13 show the velocity of the driven unit 28, when the drive frequency 1/Td is 30 kHz and when $ta_1$ and $tb_1$ change.

FIG. 12 shows a relationship of the velocity of the driven unit 28 to $tb_1$/T in the conditions of $ta_1$/T=0.5, 0.7, 1.0, 1.3, and 1.5. FIG. 13 shows the same relationship of the velocity of the driven unit 28 to the $tb_1$/Td, in the conditions of $ta_1$/T=1.5, 1.7, 2.0, 2.3, and 2.5.

Referring to FIGS. 12 and 13, it is possible to drive the driven unit 28 efficiently, when certain relationships of $ta_1$ and $tb_1$ to the resonance frequency 1/T of the system are satisfied. This is thought to be caused by utilizing the resonance of the system, or by avoiding undesirable effects of the resonance of the system.

Specifically, it is possible to drive the driven unit 28 efficiently, when the following equations (4), (5) and (6) are satisfied:

$$(n_1+1)T - 0.3T \leq ta_1 \leq (n_1+1)T + 0.3T \quad (4)$$

$$0.95(n_2+0.5)T - 0.3T \leq tb_1 \leq 0.95(n_2+0.5)T + 0.3T \quad (5)$$

$$ta_1 + tb_1 \leq Td \quad (6)$$

More specifically, it is possible to drive the driven unit 28 more efficiently, when the following equations (7) and (8) are satisfied:

$$ta_1 = (n_1+1)(n_1=0, 1) \quad (7)$$

$$tb_1 = 0.95(n_2+0.5)T(n_2=0, 1, 2) \quad (8)$$

Although FIGS. 8 through 13 show some cases in which the driven unit 28 is driven in the forward direction, the performance of driving the driven unit 28 in the backward direction is the same as that in the forward direction.

Next, a second embodiment will be explained, referring to FIG. 14.

The second embodiment uses the same drive circuit 30 as that of the first embodiment. However, the waveform of the voltage applied to the piezoelectric element 22 is different from that of the first embodiment. Such a difference will be explained hereinafter, and like or corresponding parts are designated by the same reference numerals as those of the first embodiment.

FIGS. 14A through 14C show a case of driving the driven unit 28 in the forward direction. There is provided a short time "t" between the first section designated by a reference numeral 50, in which terminals Sc1, Sc2 are in a state of low signal, and the second section designated by a reference numeral 52, in which terminals Sc3, Sc4 are in a state of low signal. During the short time, terminals of the piezoelectric element 22 are connected with each other, and then the drive voltage Vload keeps 0 (zero) volt designated by a reference numeral 58 in a short while, on its way from +Vp designated by a reference numeral 54 to −Vp designated by reference numeral 56.

FIGS. 14D through 14F show a case of driving the driven unit 28 in the backward direction. There is provided a short time "t" between a first section designated by a reference numeral 53, in which terminals Sc3, Sc4 are in a state of low signal, and a second section designated by a reference numeral 51, in which terminals Sc1, Sc2 are in a state of low signal. During the short time, terminals of the piezoelectric element 22 are connected with each other, and then the drive voltage Vload keeps 0 (zero) volt designated by a reference numeral 59 in a short while, on its way from −Vp designated by a reference numeral 57 to +Vp designated by a reference numeral 59.

Corresponding to the first embodiment in which the voltage applied to the piezoelectric element 22 changes from −Vp to +Vp, or from −Vp to +Vp directly, the short time "t", in which terminals of the piezoelectric element short with each other, reduces the difference between a voltage of the power source Vp and a voltage at each terminal of the piezoelectric element 22 by half. Thereby, it is possible to reduce electric power consumption. If the time "t" is sufficiently smaller than the resonance period T of the system including the piezoelectric element 22 and the drive rod 26, it has no or negligible influence on a displacement of the drive rod 26, and thus there is no sufficient influence on the driving performance.

In the second embodiment, the electric power consumption is made about two third of that of the first embodiment.

Next, a third embodiment will be explained, referring to FIG. 15.

There is a range limit of the driving velocity, according to the manner of the first embodiment and that of the second embodiment.

The third embodiment employs the drive circuit 30, which is the same as that of the first embodiment, and the manner for driving the driven unit 28 at relatively low speed is also the same as that of the first embodiment. In the meantime, the manner for driving the driven unit 28 at relatively high speed is different from that of the first embodiment. That is, a voltage having a square waveform is applied to the piezoelectric element 22.

Specifically, as shown in FIGS. 15A through 15C, the manner for driving the driven unit 28 at relatively low speed, for example, in the forward direction, is the same as that of the first embodiment, for example, as shown in FIGS. 7A through 7C.

In the mean time, the manner for driving the driven unit 28 at relatively high speed is to repeat a first period as shown by a reference numeral 60, in which terminals Sc1, Sc2 is in a state of low signal, and a second period as shown by a reference numeral 62, in which terminals Sc3, Sc4 are in a state of low signal, alternatively. Thereby, the drive voltage Vload has a square waveform repeating +Vp as shown by reference numeral 64 and −Vp as shown by reference numeral 66 alternatively.

It is possible to drive the driven unit 28 at high speed by applying the voltage having the square waveform to the piezoelectric element 22. Although it is certainly possible to drive the driven unit 28 at relatively low speed by decreasing the frequency or the duty ratio of the square waveform, small driving force makes it difficult to realize a stable drive. In the meantime, according to the manner of the first embodiment or that of the second embodiment, in which the voltage applied to the piezoelectric element 22 has not a typically square waveform like that of high speed but a generally square waveform comprising horizontal straight parts and vertical straight parts, it is possible to drive the driven unit 28 at relatively low speed stably. Accordingly, it is possible to extend the driving range, by selecting one of the manner suitable for low speed drive and that suitable for high speed drive, depending on a speed at which the driven unit 28 should be driven.

For example, when the manner for driving the driven unit 28 at relatively low speed is the same as that of the first embodiment, the speed of the driving unit 28 is about 1 mm/sec on the same conditions as the first embodiment, as shown in FIG. 11. In the manner for driving at relatively high speed, the speed of the driving unit 28 is, for example, about 12 mm/sec at the following conditions: the drive voltage Vload applied to the piezoelectric element 22 has the square waveform, in which the driving frequency is 150 kHz and the duty ratio is 0.3.

In the third embodiment, it is possible to make both the drive at relatively low speed and that at relatively high speed stable, employing a common driving circuit.

As descried above, it is possible to drive the driven unit 28 at low speed stably, by means of a circuit employing a simple construction.

Although the present invention has been fully described about the preferred embodiments thereof with reference to the accompanying drawings, it is to be noted that various changes and modifications are also apparent to those skilled in the art.

For example, a circuit for applying a voltage to the piezoelectric element 22 is not limited to that of the above-described embodiments. Although a voltage applied to the piezoelectric element 22 changes, for example, −3, 0, +3, −3, 0, +3, −3, 0, +3 . . . volts sequentially in the above-described embodiments, the voltage may change, for example, −3, 0.5, +3, −3, −0.5, +3, −3, 0.3, +3 . . . volts sequentially, depending on the characteristics of a circuit. That is, a certain range of the second voltage (an intermediate voltage), for example, a rang of −0.5 to +0.5 volt, is acceptable to drive the driven unit 28 without functional problem.

The type of the driving mechanism to which the present invention may be applied is not limited to the element-fixed type in which the electromechanical transducer is fixed to a stationary member. The present invention may also be applied to various types of the driving mechanisms employing the electromechanical transducer. For example, it may be applied to a type in which a driven member is fixed to a stationary member, to another type in which a drive member is fixed to a stationary member, and to still another type which is a self-advancing type.

What is claimed is:

1. A drive mechanism, comprising:

an electromechanical transducer having a pair of ends in expanding and contracting direction;

a drive member fixed to one of the ends of the electromechanical transducer;

a driven member which contacts frictionally with the drive member under a predetermined frictional force exerted therebetween; and a drive circuit for applying a drive voltage to the electromechanical transducer, wherein the drive voltage repeats a cycle of a first voltage having a value which is one of a maximum value and a minimum value, a second voltage having a value which is a value intermediate between the maximum value and the minimum value, and a third voltage having a value which is the other of the maximum value and the minimum value, and wherein applying the drive voltage to the electromechanical transducer causes the electromechanical transducer to expand and to contract so as to move the driven member along the drive member relatively.

2. A drive mechanism as claimed in claim 1, wherein inequalities of $$(n_1+1)T-0.3T \leq ta \leq (n_1+1)T+0.3T,$$

$$0.95(n_2+0.5)T-0.3T \leq tb \leq 0.95(n_2+0.5)T+0.3T,$$

and $$ta+tb<Td$$

are satisfied, where T is a resonance period of a system including the electromechanical transducer and the drive member, where Td is a drive period of the drive voltage applied to the electromechanical transducer by the drive circuit, where ta is a first period for which the first voltage is applied to the electromechanical element, where tb is a third period for which the third voltage is applied to the electromechanical transducer, where $n_1$ is one of zero and positive integers, and where $n_2$ is one of zero and positive integers.

3. A drive mechanism as claimed in claim 1, wherein the first voltage and the third voltage are equal and of opposite sign, and wherein the second voltage is zero volt.

4. A drive mechanism as claimed in claim 1, wherein applying the drive voltage to the electromechanical transducer causes the electromechanical transducer to expand at a first velocity and to contract at a second velocity, different from the first velocity, so as to move the driven member along the drive member relatively.

5. A drive mechanism as claimed in claim 1, wherein the drive voltage applied to the electromechanical transducer has a generally square waveform comprising horizontal straight parts and vertical straight parts.

6. A drive mechanism "as claimed in claim 1, wherein the drive circuit comprises:

a first switching unit for applying the first voltage to the electromechanical transducer;

a second switching unit for applying the second voltage to the electromechanical transducer;

a third switching unit for applying the third voltage to the electromechanical transducer; and a controller for controlling the first switching unit, the second switching unit, the third switching unit and the fourth switching unit so that the drive voltage repeats the cycle.

7. A drive mechanism as claimed in claim 1, wherein the electromechanical transducer having a pair of terminals, and wherein the drive circuit comprises:

a first switching element operating as a switch and having a pair of terminals;

a second switching element operating as a switch and having a pair of terminals; a third switching element operating as a switch and having a pair of terminals;

a fourth switching element operating as a switch and having a pair of terminals; and a controller for controlling the first switching element, the second switching element, the third switching element and the fourth switching element, wherein one of the terminals of the electromechanical transducer is connected to one of the terminals of the first switching element and one of the terminals of the second element, wherein the other of the terminals of the electromechanical transducer is connected to one of the terminals of the third switching element and one of the terminals of the fourth element, wherein the other of the terminals of the first switching element and the other of the terminals of the third switching element are connected to one of terminals of a power source, and wherein the other of the terminals of the second switching element and the other of the terminals of the fourth switching element are connected to the other of the terminals of the power source.

8. A drive method for running a drive mechanism which comprises:

an electromechanical transducer having a pair of ends in expanding and contracting direction;

a drive member fixed to one of the ends of the electromechanical transducer; and a driven member which contacts frictionally with the drive member under a predetermined frictional force exerted therebetween, the drive method comprising:

a first step of generating a drive voltage, wherein the drive voltage repeats a cycle of a first voltage having a value which is one of a maximum value and a minimum value, a second voltage having a value which is a value intermediate between the maximum value and the minimum value, and a third voltage having a value which is the other of the maximum value and the minimum value;

a second step of applying the drive voltage generated at the first step to the electromechanical transducer; and a third step of expanding and contracting the electromechanical transducer by the drive voltage applied to the electromechanical transducer at the second step so as to move the driven member relatively.

9. A drive method as claimed in claim 8, wherein inequalities of $$(n_1+1)T-0.3T \leq ta \leq (n_1+1)T+0.3T,$$

$$0.95(n_2+0.5)T-0.3T \leq b \leq 0.95(n_2+0.5)T+0.3T,$$

and $$ta+tb<Td$$

are satisfied, where T is a resonance period of a system including the electromechanical transducer and the drive member, where Td is a drive period of the drive voltage applied to the electromechanical transducer by the drive circuit, where ta is a first period for which the first voltage is applied to the electromechanical element, where tb is a third period for which the third voltage is applied to the electromechanical transducer, where $n_1$ is one of zero and positive integers, and where $n_2$ is one of zero and positive integers.

10. A drive method as claimed in claim 8, wherein the first voltage and the third voltage are equal and of opposite sign, and wherein the second voltage is zero volt.

11. A drive method as claimed in claim 8, wherein applying the drive voltage to the electromechanical transducer at the third step causes the electromechanical transducer to expand at a first velocity and to contract at a second velocity, different from the first velocity, so as to move the driven member along the drive member relatively.

12. A drive method as claimed in claim 8, wherein the drive voltage generated at the first step has a generally square waveform comprising horizontal straight parts and vertical straight parts.

* * * * *